Figure 1:
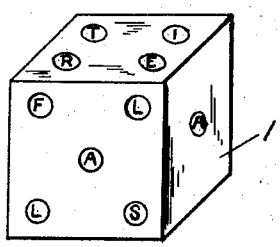
Figure 1:
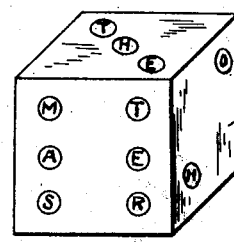

June 26, 1928.

G. D. KRATZ 1,674,648

ADVERTISING NOVELTY

Filed Dec. 23, 1927

INVENTOR
GEORGE D. KRATZ.
BY
Ely H Barrow
ATTORNEYS.

Patented June 26, 1928.

1,674,648

UNITED STATES PATENT OFFICE.

GEORGE D. KRATZ, OF AKRON, OHIO.

ADVERTISING NOVELTY.

Application filed December 23, 1927. Serial No. 242,081.

This invention relates to a new and attractive form of advertising novelty, the purpose of which is to combine with a well known and popular game certain features by which goods may be advertised. The game of dice as commonly played with two dice relies upon various combinations of numbers on the two dice, as is well known. The present invention proposes to use the same two dice with the addition of certain letters which form words constituting the name of the goods to be advertised, the words being six in number and having one to six letters therein which are arranged in the various spots on the dice. The combination of numbers on the dice which enables the dice game to be played, also forms combinations of words which have advertising value.

The invention is illustrated in the drawings, in which

Figure 2:
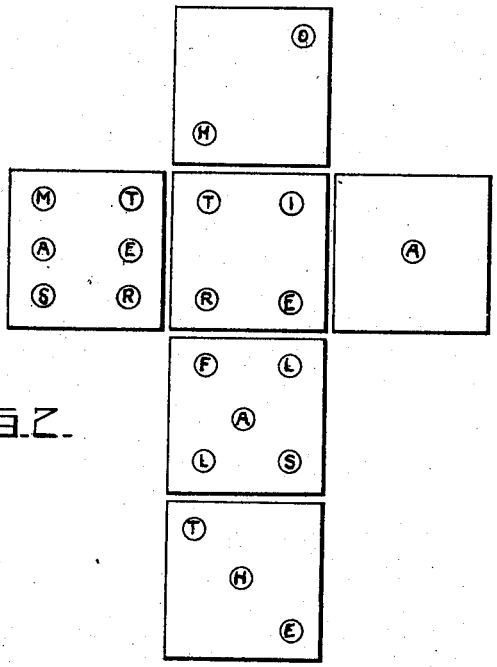

Figure 1 represents a pair of dice showing the various forms thereon which constitute the several words to be employed; and Figure 2 is a diagrammatic view of the six faces of the cubical dice.

The dice bodies are shown at 1 and have upon their faces the usual arrangement of spots or pips from one to six. The several spots or pips have letters therein which constitute the words to be used in the advertising novelty. In the example shown herein, the words are as follows:

1—A
2—OH
3—THE
4—TIRE
5—FALLS
6—MASTER

This is, of course, given as an example merely and is not intended to be restrictive as other words or combinations of words may be employed. When two dice are thrown, the various combinations of words are shown. Thus in throwing a lucky seven, the following combinations appear:

1-6—A MASTER
2-5—OH FALLS
3-4—THE TIRE

In throwing a lucky eleven, the following appear:

5-6—FALLS MASTER

Other combinations are:

3-6—THE MASTER
5-4—FALLS TIRE and so on.

In throwing more than two dice, longer sentences or slogans may be had as is obvious.

The invention, of course, is not limited to six sided or cubical dice, but may be extended to blocks of more or less number of sides and corresponding pips and letters.

The characteristic feature of the present invention is the construction of dice by which the usual games can be played, which give combinations of words, having corresponding number of letters therein, which make the advertising phrases or slogans.

What is claimed is:

A combination game and advertising novelty comprising a plurality of dice having the usual pips thereon in numerical order, each pip being provided with a letter and the several pips on each surface spelling words, so that when the plurality of dice are cast, combinations of words will appear on the upper surfaces thereof in conjunction with the usual number combinations, each of the words having a number of letters corresponding to the numbers of the pips.

GEORGE D. KRATZ.